United States Patent [19]

Berger et al.

[11] Patent Number: 5,118,578
[45] Date of Patent: Jun. 2, 1992

[54] CONTROLLED ELECTRICALLY CONDUCTIVE ENVIRONMENTAL SURFACES

[75] Inventors: Albert J. Berger; Cir C. Engay, both of Los Angeles, Calif.

[73] Assignee: Coatings/Composites, Inglewood, Calif.

[21] Appl. No.: 448,232

[22] Filed: Dec. 11, 1989

[51] Int. Cl.$^5$ .......................... B32B 27/38; B05D 3/02
[52] U.S. Cl. .................................... 428/413; 427/379; 427/393.1; 427/393.6; 427/407.1; 427/468; 428/904.1; 428/922
[58] Field of Search ............ 427/393.1, 407.1, 408, 427/379, 393.6, 58; 252/400; 428/413, 904.4, 922

[56] References Cited

U.S. PATENT DOCUMENTS

| | | | |
|---|---|---|---|
| 3,894,169 | 7/1975 | Miller | 422/407.1 |
| 4,460,625 | 7/1984 | Emmons et al. | 427/407.1 |
| 4,699,820 | 10/1987 | Herr et al. | 427/407.1 |
| 4,879,143 | 11/1989 | Rang | 427/407.1 |

*Primary Examiner*—Janyce Bell
*Attorney, Agent, or Firm*—William W. Haefliger

[57] ABSTRACT

A method of forming an electrically conductive floor or wall coating that includes: applying to the surface of the floor or wall a first coating consisting essentially of a conductive pigment A, an inorganic binder in which the pigment is dispersed, and a hardener; allowing the first coating to become tack free, and applying to the first coating a second coating consisting of a conductive pigment B, a non-conductive pigment C, a binder in which pigments B and C are dispersed, and a flow control substance; and allowing the second coating to become dry to the touch.

6 Claims, 1 Drawing Sheet

CONTROLLED ELECTRICALLY CONDUCTIVE ENVIRONMENTAL SURFACES

BACKGROUND OF THE INVENTION

This invention relates generally to the provision of work or other surfaces having controlled electrical conductivity, and more particularly, the provision of coatings on floor or other surfaces, such coatings characterized a providing electrical conductivity, such as to allow electrical current flow.

It is found that material surfaces, typically having certain moisture content, provide for electrical current flow, but that when such surfaces become dry, their resitivity increases to the point that electrical current will not flow in or through them.

In certain instances it becomes necessary to provide for assured electrical current flow in or through surfaces (such as floors, walls, etc.), an example being in electronic assembly rooms where grounding leads are attached between workers' wrists and the floor, to ground stray current. Accordingly, there is need for assuredly conductive surfaces.

SUMMARY OF THE INVENTION

It is a major object of the invention to provide a method for producing such an assuredly conductive surface or surfaces. Basically, the method includes the steps:

a) applying to the surface of the floor or wall a first coating consisting essentially of a conductive pigment A, an organic binder in which the pigment is dispersed, and a diluent (hardener), b) allowing the first coating to set (dry tack free), and c) applying to the first coating a second coating consisting of a conductive pigment B, a non-conductive pigment C, and organic binder in which pigments B and C are dispersed, and a flow control substance, d) and allowing the second coating to dry.

Further, the method includes determining the electrical resistance of the first coating, and of the composite of the two coatings. As will appear, the resistance of the first coating must be between 0 and 500,000 ohms, and the resistance of the second coating must be between 1 and 100 megohms.

The coatings are applied to have total thickness between 0.010 and 0.250 inches; and each coating is at least 0.005 inch thick.

These and other objects and advantages of the invention, as well as the details of an illustrative embodiment, will be more fully understood from the following specification and drawings, in which:

DRAWING DESCRIPTION

DETAILED DESCRIPTION

Figure 1:
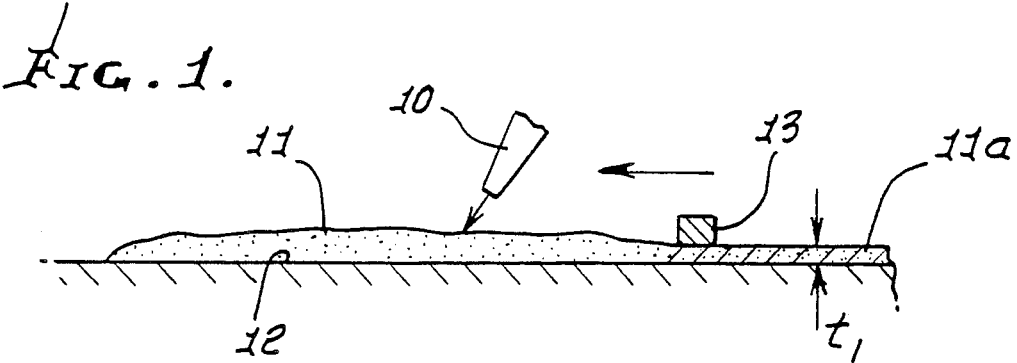
FIG. 1 is an elevation taken in section showing application of a first coating to a surface.
Figure 2:
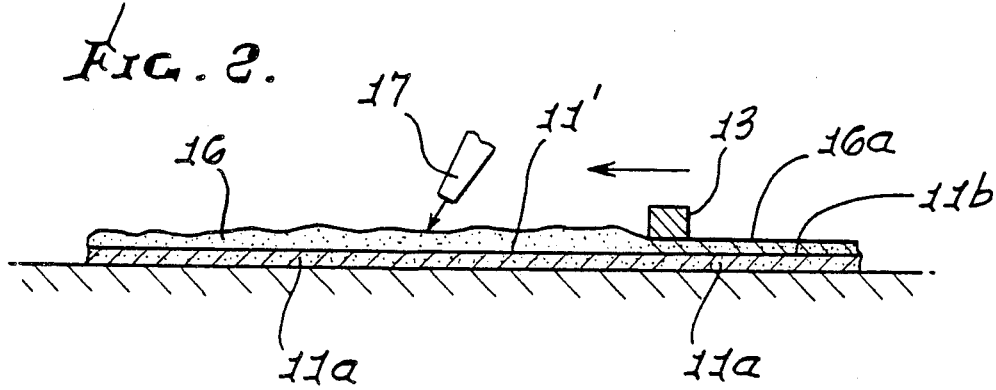
FIG. 2 is a view like FIG. 1 showing application of a second coating onto the first coating.

FIG. 1 shows application at 10 of first coating material 11 onto a surface 12. While the description will refer to a floor surface, it will be understood that the invention is applicable to any surface, such as a wall, floor, ceiling, etc. The material is in a spreadable mass or slowly flowable viscous condition, and wets surface 12. A leveling device 13 may be employed to produce a uniform thickness "t", coating 11a and that dimension may vary from 0.003 inches to a larger thickness. The material 11 is typically applied under ambient temperature conditions, and it dries to form coating 11a bonded to the surface 12, in from about 30 minutes to about 24–48 hours, depending upon formulation of the binder component in the coating.

After completion of first coating drying, a second material 16 is applied at 17 onto the exposed surface of the first coating 11'. Material 16 is in spreadable mass or slowly flowable viscous condition, and wets the surface 11b of coating 11a. Leveling device 13a may be employed to produce uniform thickness "t$_2$" coating 16a, and that coating may vary from 0.005 inches to a larger thickness, where the total thickness T of both coatings (t$_1$ and t$_2$) is between 0.010 inches and about 0.250 inches. The second coating is then cured at ambient temperature for between 30 minutes to 24–48 hours, depending upon its formulation.

The coating ingredients and their amounts consist essentially of:

| FIRST COATING | | |
|---|---|---|
| Ingredient | Range of wt. % | Preferred wt. % |
| conductive pigment A | 25 to 65 | 40 |
| binder | 10 to 50 | 40 |
| hardener (diluent) | 20 to 40 | 20 |

The conductive, comminuted pigment A consists of one or more of the following:
carbon particles
silver or silver coated particles
nickel or nickel coated particles
copper or copper coated particles These particles may be one or more of the following forms:
powder (5 microns to 30 mils)
flake (30 microns to 30 mils cross dimension and 0.3 microns to 5 mils thick)
fiber (30 mils to 0.5 inch, in length, and 20 microns to 5 mils thick)

Among the suitable binders are: acrylics, epoxides, and polyvinyls. Hardeners include: polyfunctional amines (alkyl diphenyl ether, for example) for epoxides; and suitable known catalysts for acrylics and vinyls. The ingredients in the coating are thoroughly mixed, so that the pigment particles are completely dispersed, uniformly, in the binder, prior to application.

| SECOND COATING | | |
|---|---|---|
| Ingredient | Range of wt. % | Preferred wt. % |
| conductive pigment B | 30 to 50 | 40 |
| non-conductive pigment C | 10 to 20 | 15 |
| binder | 20 to 40 | 30 |
| hardener (diluent) | 10 to 20 | 15 |

The particulate on conductive pigment B consists of one or more of the following (as in the case of A):
powder (5 microns to 30 mils)

flake (30 microns to 30 mils cross dimension and 0.3 microns to 5 mils thick)

fiber (30 mils to 0.5 inch, in length, and 20 microns to 5 mils thick)

The binder and hardener may have the same compositions in the first coating. The non conductive pigment C consists of silica flour, clay, or other inert particulate material, and typically has a size between 5 microns to 50 mils.

Figure 3:
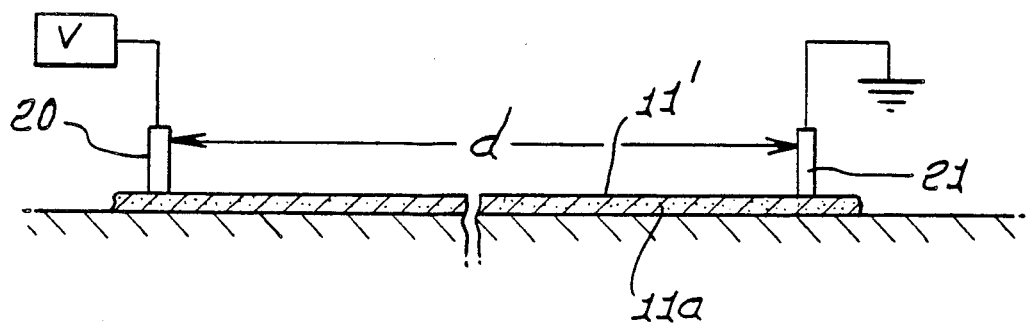
FIG. 3 is a view like FIG. 1 showing electrical resistance testing of the first coating.

FIG. 3 shows electrical resistance testing of the first layer 11a, using electrodes 20 and 21 separated by distance "d" and contacting the surface of the cured coating. Resistance of this coating must be in the range 0 to 1 megohm under applied voltage of 10 to 1000 volts applied to 20. Electrode 21 is grounded.

Figure 4:
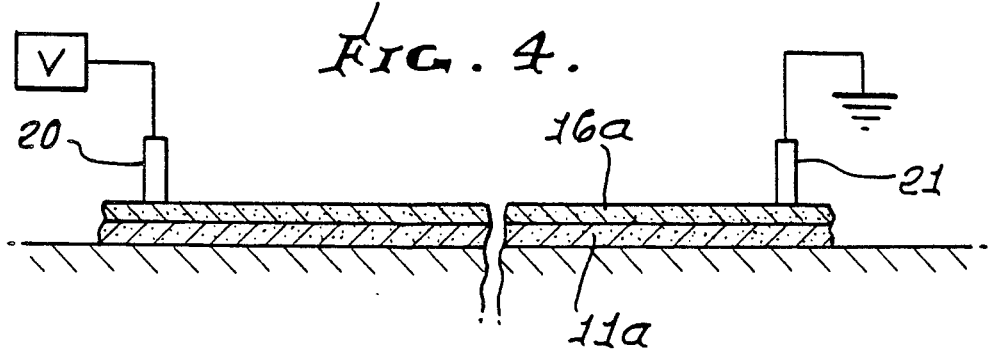
FIG. 4 is a view like FIGS. 1 and 2 showing the completed and cured coatings, and electrical resistance testing.

FIG. 4 shows electrical resistance testing of the final composite of coatings 11a and 16a, using electrodes 20 and 21 separated by distance "d", and contacting the upper surface of coating 16a. Electrical resistance must be in the range 1 to 100 megohms under applied voltage of 10 to 1,000 volts. The preferred electrical resistance of the composite is about 5 megohm; and the preferred electrical resistance of the first coating is about 200,000 ohms.

The coatings have thicknesses as follows:
first coating: between 0.005 and 0.010 inches
second coating: between 0.10 and 0.3 inches
The coatings are applied at ambient temperature.

I claim:

1. The method of forming an electrically conductive floor or wall coating, that includes:
   a) applying to the surface of the floor or wall a first coating consisting essentially of an electrically conductive pigment A, an organic binder in which the pigment is dispersed, and a hardener,
   b) allow the first coating to dry, and
   c) applying to the first coating a second coating consisting of an electrically conductive pigment B, a non electrically conductive pigment C, a binder in which pigments B and C are dispersed, and a flow control substance,
   d) and allowing the second coating to dry,
   e) said binder in each coating consisting essentially of epoxide,
   f) said hardener in each coating selected from the group consisting of polyfunctional amines,
   g) the weight percentages of first coating ingredients are:

| | |
|---|---|
| pigment A | 25 to 65 wt. % |
| binder | 10 to 50 wt. % |
| hardener | 20 to 40 wt. % | h) the weight percentage of second coating ingredients are:

| | |
|---|---|
| pigment B | 30 to 50 wt. % |
| pigment C | 10 to 20 wt. % |
| binder | 20 to 40 wt. % |
| hardener | 10 to 20 wt. % | i) and wherein the electrical resistance of the composite of the two coatings, as measured at the surface of the second coating, when cured, is between 1 and 100 megohms.

2. The method of claim 1 wherein the electrical resistance of the first coating when cured is between 0 and 1 megohm.

3. The method of claim 1 wherein the electrical resistance of the first coating is about 200,000 ohms.

4. The method of claim 1 wherein said coatings have thicknesses as follows:
first coating: between 0.005 and 0.010 inches
second coating: between 0.10 and 0.3 inches 5. The method of claim 1 wherein said coatings are applied at ambient temperatures.

6. The conductive floor or wall coating produced by the method of claim 1.

* * * * *